No. 743,833. PATENTED NOV. 10, 1903.
T. L. CREATH.
CORN SHOCKER.
APPLICATION FILED MAR. 8, 1902.
NO MODEL. 3 SHEETS—SHEET 1.

WITNESSES:

INVENTOR
Thomas L. Creath
BY
ATTORNEYS

No. 743,833. PATENTED NOV. 10, 1903.
T. L. CREATH.
CORN SHOCKER.
APPLICATION FILED MAR. 8, 1902.
NO MODEL. 3 SHEETS—SHEET 2.
Fig. 3.
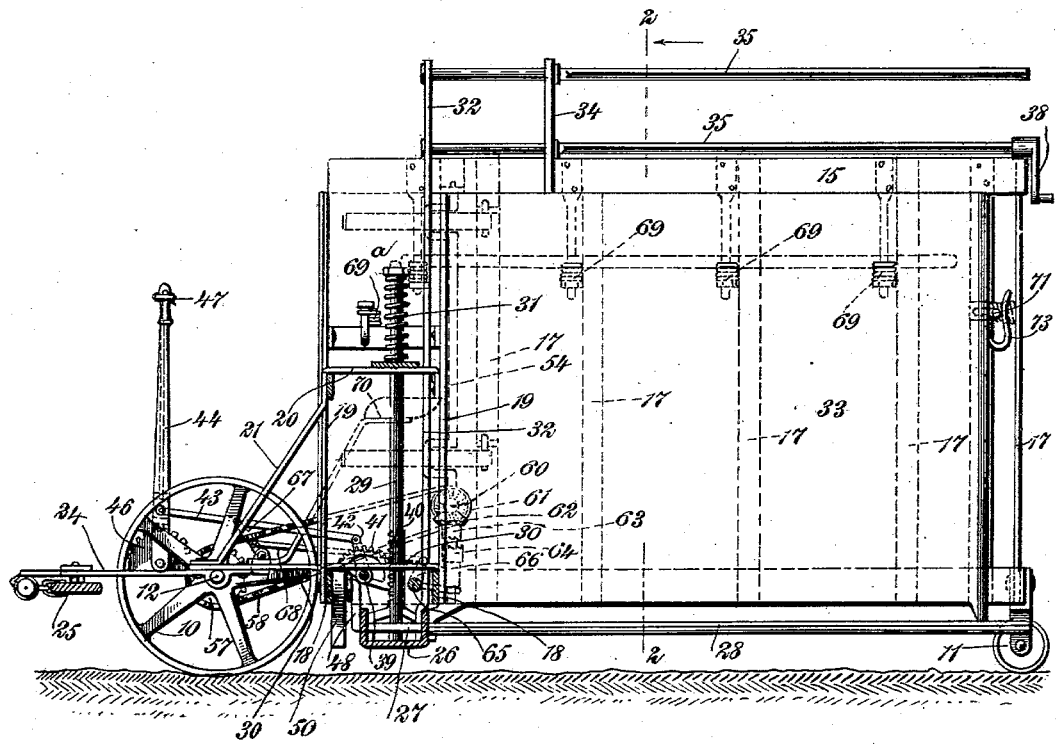
Fig. 6.
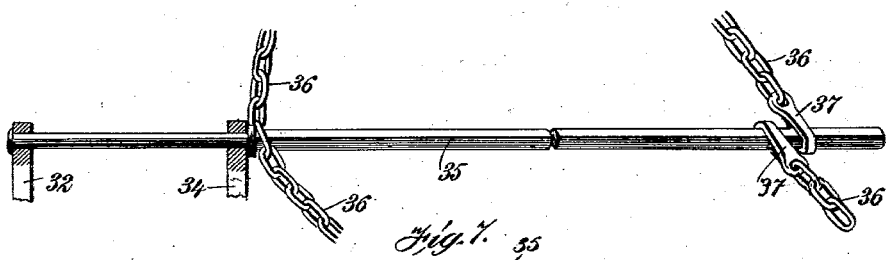
Fig. 7.
WITNESSES:
Geo W Naylor
J. B. Owens
INVENTOR
Thomas L. Creath
BY
ATTORNEYS No. 743,833. PATENTED NOV. 10, 1903.
T. L. CREATH.
CORN SHOCKER.
APPLICATION FILED MAR. 8, 1902.
NO MODEL. 3 SHEETS—SHEET 3.

WITNESSES:
Geo. W. Naylor
J. B. Owens

INVENTOR
Thomas L. Creath
BY
ATTORNEYS

No. 743,833.  Patented November 10, 1903.

UNITED STATES PATENT OFFICE.

THOMAS LOOFBAURROW CREATH, OF MOUNT STERLING, OHIO.

CORN-SHOCKER.

SPECIFICATION forming part of Letters Patent No. 743,833, dated November 10, 1903.

Application filed March 8, 1902. Serial No. 97,248. (No model.)

*To all whom it may concern:*

Be it known that I, THOMAS LOOFBAURROW CREATH, a citizen of the United States, and a resident of Mount Sterling, in the county of Madison and State of Ohio, have invented a new and Improved Corn-Shocker, of which the following is a full, clear, and exact description.

This invention relates to an apparatus adapted to be used in connection with a corn-harvester, the apparatus receiving the corn from the harvester and packing it into bundles ready for tying, after which operation the shock is deposited on the ground as the machine moves along the rows of corn.

This specification is an exact description of one example of the invention, while the claims define the actual scope thereof.

Reference is to be had to the accompanying drawings, forming a part of this specification, in which similar characters of reference indicate corresponding parts in all the views.

Figure 1:
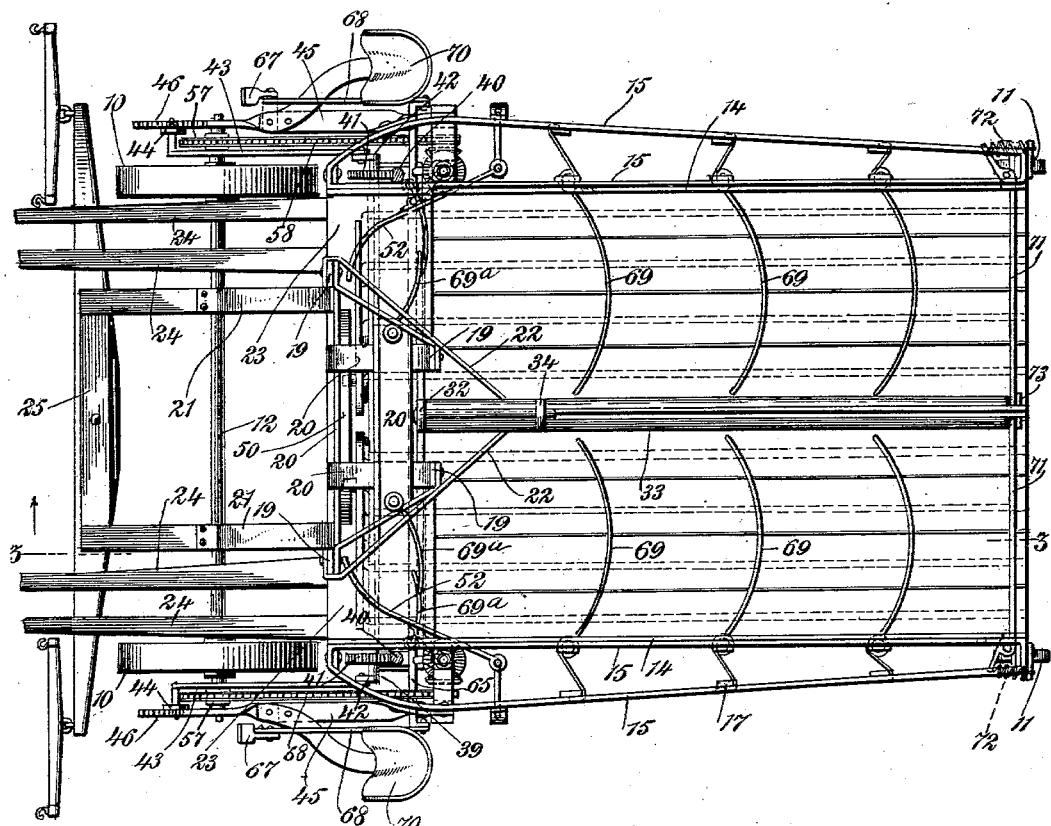
Figure 2:
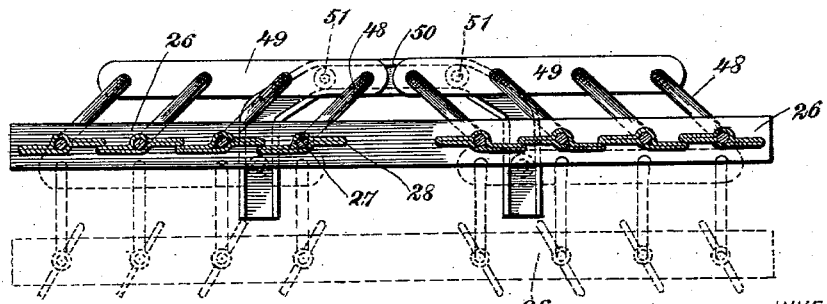
Figure 4:
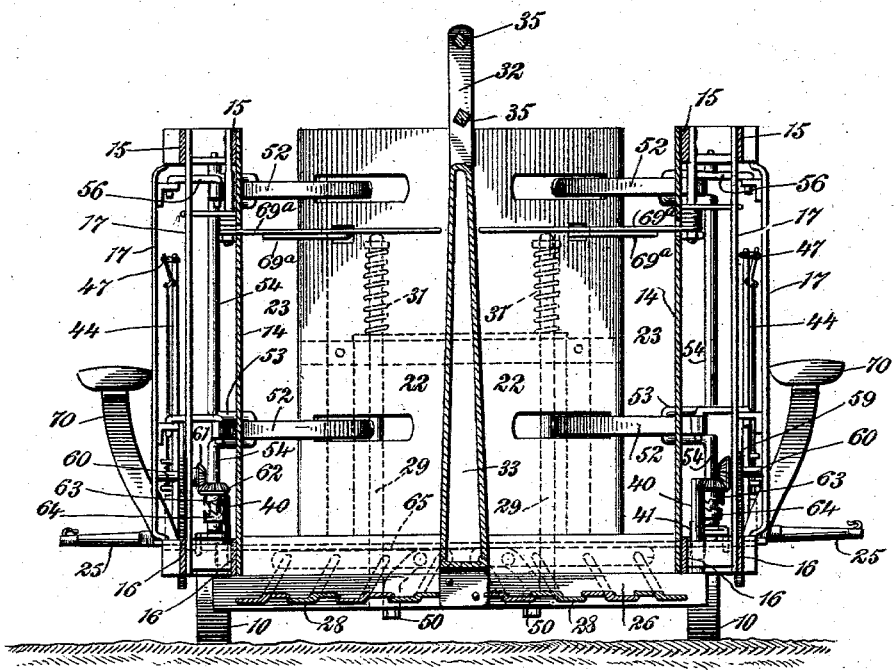
Figure 5:
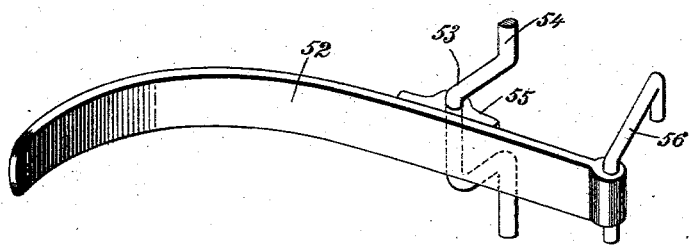

Figure 1 is a plan view of the invention. Fig. 2 is a view showing the operation of the dumping-platform, parts being in section on the line 2 2 of Fig. 3. Fig. 3 is a section on the line 3 3 of Fig. 1. Fig. 4 is a cross-section of the machine on the line 2 2 of Fig. 3. Fig. 5 is a detail perspective view of one of the packer-arms. Fig. 6 is a detail perspective view of one of the rods and chains for tightening the bundle preparatory to tying the same; and Fig. 7 is a fragmentary view showing the lower position of the middle wall of the platform, in which position the stop-arms at the rear of the machine are released.

As best shown in Figs. 1 to 3, the apparatus is supported on two front wheels 10 and two rear wheels 11. The front wheels 10 are carried on an axle 12, which passes transversely across the machine, from side to side thereof, and the wheels 11 are mounted on short independent axles, one at each side of the machine, at the rear thereof. At each side of the machine is arranged a side frame made up of an inner vertical wall 14, these walls being each connected at their tops to one of two girders 15 and at their bottoms to one of two girders 16. (See Fig. 4.) The members of each pair of girders 15 are connected together at their ends, (see Fig. 1,) and the members of each pair of girders 16 are connected together at their rear ends in the same manner. The pairs of girders 15 and 16 are connected to each other at each side by vertical tie-bars 17, which tie-bars may be of any number desired. The two pairs of girders 16 are joined at their front ends to rigid tie-bars 18, running horizontally across the front of the machine, at the lower part thereof. Mounted on the front frame-bars 18 is a rigid superframe made up of four or more vertical bars 19, joined together at their upper portions by tie-plates 20 and rigidly braced against the axle 12 by means of bars 21. Held at each side of the superframe 19 are vertical walls 22, which converge toward each other as they extend rearward and are therefore in the form, essentially, of a V, as indicated in Fig. 1. The parts 15 to 21, inclusive, form the rigid framing of the apparatus, and the walls 14 and 22 are held firmly on this framing. It will be observed that the walls 14 and 22 form two passages through which the corn may be moved, these passages occurring at the points 23 (indicated in Figs. 1 and 4) and located one at each side of the machine.

As before stated, the apparatus is adapted to be connected immediately to the harvester, so as to receive the corn from the cutting apparatus thereof. This connection is effected by means of draw-beams 24, fastened rigidly to the front frame-bar 18 and to the axle 12 and projecting forwardly to the harvester, which is not here illustrated.

25 indicates the draft devices, which may be of any suitable sort and by means of which a team may be attached to the apparatus. Suitable means are employed with the harvester for keeping the corn standing on end and for delivering it rearward through the two passages 23. These means also have not been illustrated in the drawings, since they form no part of the present invention.

The dumping-platform on which the shocks are formed will now be described. A main frame member 26 is mounted just below the front frame-bars 18 and extends transversely across the machine. (See Figs. 3 and 4.) This frame member 26 is preferably in the form of a channel-iron and has the longitudinal shafts 27 mounted therein at their front ends. These shafts carry plates 28, which are adapted to lie in horizontal position, as shown by full lines in Fig. 2, thus forming an unbroken platform. By turning the shafts 27 into the position shown by dotted lines in said view the plates 28 will be placed in vertical or approximately vertical position for a purpose which will be hereinafter explained. The channel-iron frame member 26 is mounted on the main framing of the machine to move vertically from the position shown in full lines in Fig. 2 to that shown by dotted lines, this being effected by means of two or more vertical rods 29, fastened rigidly to the frame member 26 and extending upward through cross-plates 30, extending across the front beams 18. (See Fig. 3.) From these plates 30 the rods 29 extend up to the cross-plates 20 of the superframe 19, being slidably mounted thereon.

31 indicates strong spiral springs which are coiled around the rods 29, tending to draw up the attached parts. Fastened rigidly to the middle of the frame member 26 and projecting upwardly therefrom is a stanchion 32, which carries a double wall 33, extending vertically and projecting rearwardly from the stanchion to the rear end of the shocker and dividing the shocker into two longitudinal passages formed by the wall 33 and the walls 14 and located one on each side of the first-named wall. Mounted in the upper end of the stanchion 32 and in a second stanchion 34, projected up from the top of the wall 33, are two horizontal shafts 35, which are arranged to turn and are located one above the other, the rear portions of these shafts being square, as best shown in Fig. 6. Referring to this figure, 36 indicates chains which are engaged at one end with the shaft 35 by means of the links of the chains and which at their other end have snap-hooks 37, which enable them to be removably engaged at their front ends with the shaft. The corn is formed in groups lying one at each side of the wall 33, and when the tying operation is to be performed the chains 36 are passed around the corn at each side of the wall and the snap-hooks 37 fastened as shown in Fig. 6. Then by applying a handle or other suitable tool to the shaft 35 it may be turned and the chains 36 wound on the shaft. This causes the chain to be contracted and the corn to be forced tightly together, which compresses it into the form of a shock, and then a string or other fastening may be applied manually. Two shafts 35 are provided, one above the other, to adapt the machine to corn of different heights, and either shaft may be used electively as desired, the chains being removed from one and placed on the other.

In Fig. 3, 38 indicates a handle connected with the lower shaft 35 whereby to turn it. This handle is of course removable, so that it may be applied to either shaft.

39 indicates a shaft passing transversely across the machine and mounted to rock in suitable boxes carried by the lower part of the framing at the front of the machine, this shaft 39 lying just over the frame member 26 of the dumping-platform. Fastened rigidly to the frame member 26 and projecting upward therefrom are two bars or racks 40, which are located one at each end of the frame member and with which are meshed toothed sectors 41, these sectors being fast on the shaft 39. At each end of the shaft 39 it is provided with a crank-arm 42, and these cranks are connected by means of links 43 with hand-levers 44, located one at each side of the machine on a forwardly-projecting frame member 45. (See Fig. 1.) The hand-levers 44 are provided with spring-pawls of the usual type, and these work with toothed quadrants 46 on the frame extensions 45.

47 indicates a ring or other suitable lock device whereby to hold the pawl of either lever 44 inactive. By providing a hand-lever 44 at each side of the machine the shaft 39 may be rocked by a person seated at either side, and by providing the ring or other device 47 whereby to hold either one of the pawls of the hand-levers inactive if a person is seated at the right-hand side the left-hand lever may have its pawl thrown into inactive position and held there, so as not to interfere with the operation at the right-hand side of the machine. This makes it possible for the machine to be operated from either side as desired, all of which will hereinafter more fully appear. The shafts 27 have their front ends formed with cranks 48, which are fastened to two horizontal bars 49, located one at each side of the machine. By reference to Fig. 2 it will be observed that the shafts 27 and the plates 28 are in two groups, here shown to be formed of four shafts each, and these groups are arranged one at each side of the wall 33. Two bars 49 are provided, one for each of the above-mentioned groups of shafts and plates.

50 indicates a guide fastened rigidly on the front frame-bar 18, and in this guide are adapted to run rollers 51, carried, respectively, on the bars 49. The guide 50 has each end curved outwardly and downwardly, as shown in Fig. 2, and as the shaft 39 is rocked it causes the sectors 41 and rack-bars 40 to throw down the frame member 26 and its attached parts. This lowers the frame member from the position shown by full lines to that shown by dotted lines in Fig. 2. Simultaneously with this action the rollers 51, acting on the guide 50, cause the bars 49 to move away from each other, and this turns the shafts 27, causing the plates 28 to move from a horizontal to a vertical or approximately vertical position. Upon the return of the member 26 a reversal of the above operation takes place, and the parts resume the position shown by full lines in Fig. 2, which is their normal or active position, the lower position being the dumping position, as will be hereinafter brought out. When the platform is moved up, as shown by full lines in Fig. 2, the plates 28 (then horizontally positioned) form the floors of the two passages in the machine through which the corn is passed.

As the corn is passed rearward through the openings 23 its movement is continued by the action of packer-arms 52. (See Figs. 1, 4, and 5.) These packer-arms are carried on cranked portions 53 of shafts 54, such cranked portions being rockably connected with the packer-arms by means of boxes 55, fastened to the arms intermediately the ends thereof. The inner ends of the packer-arms are pivotally connected by links 56 with the adjacent vertical frame members 17. The rotation of the shafts 54 will cause the packer-arms to move inward through openings in the walls 14, thence rearward through the passages 23, and then outward beyond the walls 14 and forward to recover their position, the arms working, therefore, continuously to push the grain back through the openings 23 and then to move forward outside of the walls 14 to recover their position. Preferably two packer-arms are provided at each side of the machine, as shown best in Fig. 4.

The shafts 54 are mounted vertically in suitable parts of the frame of the machine, at each side thereof, and they are driven from the wheels 10, which carry sprocket-wheels 57 and over which chains 58 run to sprocket-wheels 59 on short shafts 60, mounted horizontally in the frame at each side of the machine. The shafts 60 carry bevel-gears 61, which are in mesh with like gears 62, loose on the respective shafts 54. The gears 62 are formed with clutch members 63 thereon, and these clutch members are adapted, respectively, to be engaged by clutch members 64, splined on the shafts 54. When the parts 63 and 64 are disengaged, the shafts 54 are inactive; but when the clutch members are engaged the movement of the shafts 60 will be transmitted to the shafts 54, and the packer-arms will be driven. The clutch members 64 are actuated from a rock-shaft 65, mounted transversely in the framing of the machine, at the lower front part thereof, and this rock-shaft is connected by cranks 66 with foot-levers 67 through the medium of links 68, so that by operating the foot-levers the clutches may be thrown into or out of action whenever desired. Spring-sustained barrier-arms 69 are provided and carried, respectively, by the framing at the sides of the machine, these arms projecting from each side inward toward the wall 33 and lying across the passage through which the corn is forced to move, so that the corn is caused to be packed tightly against the barrier-arms. When, however, the pressure of the corn becomes greater than the springs which actuate these arms, the arms give way and allow the corn to pass. Located at the front of the corn-passages and approximately in vertical lines with the frame-bars 18 are barrier-arms 69$^a$, essentially the same as the barrier-arms 69, excepting that they are carried partly by the side framing of the machine and partly by suitable supports on the superframe 19. (See Figs. 1 and 4.)

At the rear of the machine are located stop-arms 71. These arms are mounted, respectively, on the side frames and project inward to the rear edge of the wall 33. Springs 72 are provided, these springs pressing the stop-arms yieldingly against the wall 33. A hook 73 is fastened to the rear edge of the wall 33, and when this wall is raised to active position the hook engages the rear ends of the stop-arms and holds them against movement. This prevents the corn from falling out through the rear end of the machine. When, however, the wall 33 drops with the other parts of the dumping-platform, the hasp or hook 73 moves downward out of engagement with the stop-arms, and the stop-arms are then free to move rearward and permit the shock to be disengaged wholly from the machine. The arms 71 immediately return by the action of their springs, and when the dumping-platform is again raised the hook 73 engages the arms and holds them as before.

Mounted on the frame extensions 45, before described, at each side of the machine, are seats 70, on which the driver of the apparatus may be seated. The driver may place himself at either side of the machine, as desired, or two men may be used to work the machine—for example, one driving the team and the other operating the levers 44 and 67.

In the use of the apparatus as the harvester advances through the corn the stalks are cut and advanced to the shocker, after which they are fed through the passages 23 into the space between the walls 14 and 33, this being effected by the action of the packer-arms 52, and these elements working with the yielding barrier-arms 69 serve to pack the grain tightly at each side of the wall 33 and against the stop-arms 71, which are now held firmly by the hook 73. When this has been done, the chains 36 are passed around the corn and the shaft 35 turned, so as to tighten up the chains and form the shock. Then the shock should be tied by a person passing the cord around it and knotting the cord manually. This done, the chain 36 should be released and the lever 44 thrown to drop the dumping-frame. This causes it to move downward directly over the ground and the plates 28 to tilt edgewise, as shown. The ends of the stalks will now rest on the ground, and the arms 71 being disengaged from the hook 73 the machine will be drawn out from under the shock, leaving it standing in the field. When this has been effected, the parts should be returned to the normal position by returning the lever 44, and the formation of a second shock will then begin.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A shocking apparatus, comprising a frame, a transverse member arranged to move vertically thereon, shafts mounted to turn in the said member, slats attached to the shafts and carried thereby, cranks connected to the shafts, a bar connecting the cranks together, a stationary guide, and a part on the bar said part running in the guide.

2. A shocking apparatus, comprising a frame, a transverse member arranged to move vertically thereon, shafts mounted to turn in the said member, slats attached to the shafts and carried thereby, cranks connected to the shafts, a bar connecting the cranks together, a stationary guide, a part on the bar, said part running in the guide, and a vertical wall carried to move vertically with the transverse member.

3. A shocking apparatus, having a frame comprising rigid side walls, a dumping-platform mounted to move bodily in a vertical direction on the frame, a middle wall carried to move with the dumping-platform, said dumping-platform comprising slats arranged at each side of the middle wall and turnable from horizontal to vertical position, and a bundling device carried on said middle wall.

4. A shocking apparatus, having a frame comprising rigid side walls, a dumping-platform mounted on the frame, a middle wall carried to move with the dumping-platform, and a revoluble shaft mounted over and longitudinally of said middle wall, for the purpose specified.

5. A shocking apparatus, having a frame comprising rigid side walls, a dumping-platform mounted on the frame, a middle wall carried to move with the dumping-platform, bundling devices mounted over and longitudinally of the middle wall, said bundling devices comprising a rotary shaft extending horizontally over the middle wall and a flexible connection removably attached thereto.

6. A shocking apparatus, having a frame comprising rigid side walls, a vertically-moving dumping-platform mounted on the frame, a middle wall carried to move with the dumping-platform, said dumping-platform comprising slats arranged at each side of the middle wall and turnable from horizontal to vertical position, means for turning the slats upon the vertical movement of the platform, and bundling devices mounted on the middle wall.

7. The combination with the rigid framing, of a transverse frame member or beam, a rod attached thereto and movable vertically in the said rigid frame, whereby movably to mount the said transverse frame member or beam, means for raising and lowering the beam, slats mounted to turn in the beam, and means for turning the slats simultaneously with the movement of the beam.

8. The combination with the rigid framing, of a transverse frame member or beam, a rod attached thereto and movable vertically in the said rigid frame, whereby movably to mount the said transverse frame member or beam, means for raising and lowering the beam, slats mounted to turn in the beam, and means for turning the slats simultaneously with the movement of the beam, said means for turning the slats comprising cranks connected to the slats and a stationary guide with which the cranks have connection.

9. A shocking apparatus, comprising a rigid frame embodying side walls, a transverse beam or platform frame member mounted to move vertically thereon, slats carried to turn in the beam, means for turning the slats simultaneously with the movement of the beam, a middle wall carried by the beam, and means for advancing the material shocked over the slats and between the walls.

10. A shocking apparatus, comprising a rigid frame embodying side walls, a transverse beam or platform frame member mounted to move vertically thereon, slats carried to turn in the beam, means for turning the slats simultaneously with the movement of the beam, a middle wall carried by the beam, means for advancing the material to be shocked over the slats and between the walls, a stop-arm mounted to swing on each side wall, and a stop-arm retaining device on the middle wall, said retaining device being operative when raised with the middle wall.

11. A shocking apparatus, comprising a rigid frame embodying side walls, a transverse beam or platform frame member mounted to move vertically thereon, slats carried to turn in the beam, means for turning the slats simultaneously with the movement of the beam, a middle wall carried by the beam, means for advancing the material shocked over the slats and between the walls, and a bundling device carried on the middle wall.

12. A shocking apparatus, comprising a rigid frame embodying side walls, a transverse beam or platform frame member mounted to move vertically thereon, slats carried to turn in the beam, means for turning the slats simultaneously with the movement of the beam, a middle wall carried by the beam, means for advancing the material shocked over the slats and between the walls, and a bundling device carried on the middle wall, said bundling device comprising a rotary shaft and a flexible connection removably attached thereto.

13. A shocking apparatus, comprising a frame, a dumping-platform, means for packing the materials shocked, a stop-arm, and a retaining device for the stop-arm, said retaining device having connection with the platform to move upon the dumping thereof, whereby to release the stop-arm, substantially as described.

In testimony whereof I have signed my name to this specification in the presence of two subscribing witnesses.

THOMAS LOOFBAURROW CREATH.

Witnesses:
JOHN W. HANAWALT,
JOHN W. CHENOWITH.